United States Patent

[11] 3,624,172

[72] Inventor George F. Adams
 Tulsa, Okla.
[21] Appl. No. 60,450
[22] Filed Aug. 3, 1970
[45] Patented Nov. 30, 1971
[73] Assignee Universal Oil Products Company
 Des Plaines, Ill.

[54] PROCESS FOR THE PRODUCTION OF PARA-XYLENE
 4 Claims, 1 Drawing Fig.
[52] U.S. Cl. .................................................. 260/668 A,
 260/674 A, 260/674 SE
[51] Int. Cl. ..................................................... C07c 5/24
[50] Field of Search ........................................... 260/668 A,
 674 A, 674 SE

[56] References Cited
UNITED STATES PATENTS
3,512,931 5/1970 Uneo et al. .................. 260/668 A
3,562,347 2/1971 Ito et al. ....................... 260/668 A Primary Examiner—Curtis R. Davis
Attorneys—James R. Hoatson, Jr. and Robert W. Erickson ABSTRACT: Para-xylene is produced from a mixture of xylenes and ethylbenzene by first separating meta-xylene from the mixture, removing ethylbenzene from the residue by fractional distillation, and then recovering para-xylene and ortho-xylene from the fractionation bottoms. The separated meta-xylene is isomerized in an isomerization zone to produce a xylene mixture with the unconverted meta-xylene being separated in a separate separation zone and recycled to the isomerization zone and the produced ortho-xylene and para-xylene being recovered with the ethylbenzene fractionation bottoms.

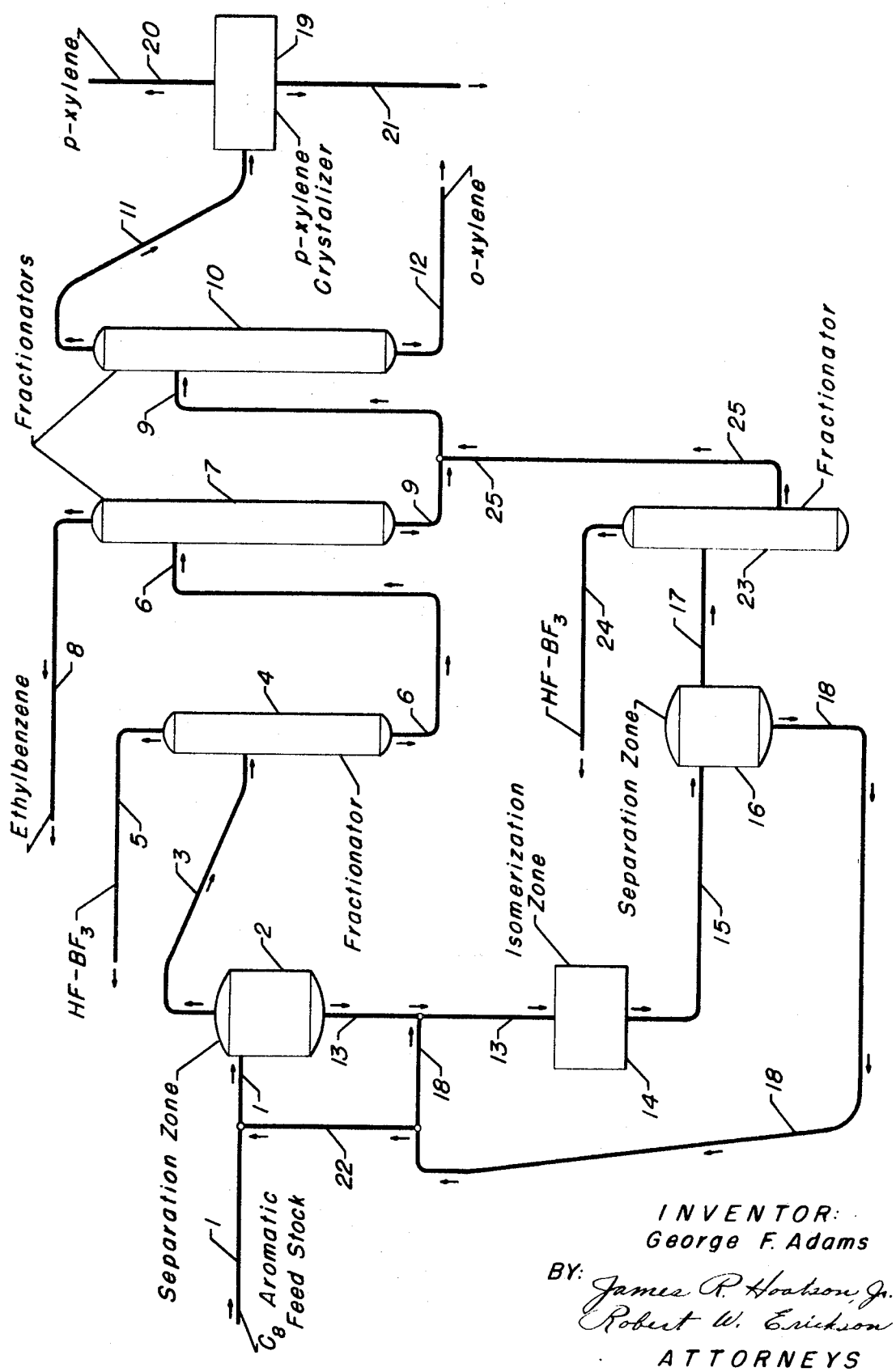

PROCESS FOR THE PRODUCTION OF PARA-XYLENE

BACKGROUND OF THE INVENTION

This invention pertains to a process for the production of para-xylene. More particularly, the present invention pertains to a process for the production of para-xylene from a mixed xylene and ethylbenzene feed stock wherein the xylenes and ethylbenzene are efficiently separated and the meta-xylene recovered is isomerized to produce para-xylene.

Of the C aromatic isomers, para-xylene is in greatest demand because of its being an intermediate in the production of terephthalic acid. Ethylbenzene, which is used to produce styrene, and ortho-xylene, which 8 is used to produce phthalic anhydride are also of considerable importance with meta-xylene being the isomer of least importance. Hence the art strives for methods of producing para-xylene from the other isomeric $C_8$ aromatics, particularly meta-xylene.

In a typical $C_8$ aromatic feed stock derived from a petroleum refinery, all of the $C_8$ isomers are present, as a mixture, in varying quantities from which each isomer is not readily separated. For example, since meta-xylene and para-xylene differ by only 0.7° C. in boiling point, they can be efficiently separated only by crystallization of the para-xylene or selective extraction of either isomer. Further ethylbenzene can be separated by distillation from a $C_8$ aromatic mixture only by an intricate super fractionation since its boiling point is within 2.2° C. of the boiling point of para-xylene.

Since there is only this 2.2° C. difference in boiling points between ethylbenzene and para-xylene, this separation, by fractional distillation, of ethylbenzene from the xylene isomers is the most expensive step in the fractionation procedures utilized to recover para-xylene. Required is a fractionation column of many trays and a high reflux ratio. For example, depending only somewhat on the exact composition of the $C_8$ aromatic feed being processed, an ethylbenzene fractionation column can contain about 300–500 plates with a reflux ratio between 50 and 250. Thus, the size and cost, of both building and operating a fractionation column for the separation of xylenes and ethylbenzene, as utilized in separating typical commercially available petroleum streams, is almost directly proportional to the total quantity of feed passed to this tower, regardless of the exact quantity of ethylbenzene and para-xylene in the feed.

One method utilized by the art to produce para-xylene (British Pat. Specification No. 1,144,067), separates meta-xylene from the other $C_8$ aromatics by utilizing HF and $BF_3$ as extraction agents. In general, that invention processes a mixture of xylenes and ethylbenzene using a specific mixture of HF and $BF_3$ to selectively extract substantially pure meta-xylene. The resulting xylene-ethylbenzene mixture after removal of trace amounts of HF and $BF_3$ is sent to an ethylbenzene fractionation column for removal of ethylbenzene, for styrene production, from the para-xylene and ortho-xylene. The para-xylene is then separated in a second fractionation column from the ortho-xylene. The meta-xylene and possibly the ortho-xylene, so recovered, are isomerized in a xylene isomerization zone to produce an equilibrium xylene mixture which is returned to the original HF—$BF_3$ extraction step. Thus, it is readily seen that all of the para-xylene so produced in the process is passed through the ethylbenzene fractionation column.

SUMMARY OF THE INVENTION

Accordingly, it is an object of the present invention to arrange a processing sequence whereby the xylenes produced in the isomerization of meta-xylene need not be processed in the described ethylbenzene fractionation column so that a net savings in investment and operating costs of the overall process may be attained. This object is accomplished by selectively removing meta-xylene from the isomerization reaction product in a separate separation zone and then separating the para-xylene from the ortho-xylene by fractional distillation.

In an embodiment therefore, the present invention involves a process for the production of para-xylene from an ortho-xylene, para-xylene, meta-xylene and ethylbenzene containing $C_8$ aromatic feed stock which comprises the steps of: (a) separating meta-xylene from said feedstock in a first separation zone to produce a first, relatively ethylbenzene free, meta-xylene containing stream and a para-xylene, ortho-xylene and ethylbenzene containing stream; (b) contacting in an isomerization zone at least a portion of said first meta-xylene stream with an isomerization catalyst at isomerization conditions selected to produce an isomerization zone product relatively free of ethylbenzene and containing meta-xylene, para-xylene and ortho-xylene; (c) separating meta-xylene from said isomerization zone product in a second separation zone to produce a second meta-xylene containing stream and a first ortho-xylene and para-xylene containing stream; (d) separating, in a first fractionation zone, said para-xylene, ortho-xylene, and ethylbenzene stream produced in step (a) into an ethylbenzene stream and a relatively ethylbenzene free, second ortho-xylene and para-xylene containing stream; and (e) separating said second ortho-xylene and para-xylene stream produced in step (d) and said first ortho-xylene and para-xylene containing stream produced in step (c) to produce a para-xylene stream and an ortho-xylene stream.

In further, more limited embodiments of the present invention, at least a portion of the second meta-xylene stream produced in step (c) and/or the ortho-xylene stream produced in step (e) is recycled to the isomerization zone of step (b). Preferably the first meta-xylene extraction zone is an HF—$BF_3$ extraction zone.

Other objects and embodiments and a more detailed description of the foregoing preferred embodiments will be found in the following detailed description of the process of the present invention.

DESCRIPTION OF THE PREFERRED EMBODIMENTS $C_8$ aromatic feedstocks containing ortho-xylene, meta-xylene, para-xylene and ethylbenzene are readily available from both petroleum and coal sources in a manner well known to those trained in the art. A preferred source is the reformate produced from a typical reforming process wherein a 200°–400° F. boiling range naphtha is reformed with a supported platinum-halogen catalyst. The $C_8$ aromatics produced and ultimately recovered in such processes are typically present in amounts of about 5–20 percent (mole) ethylbenzene, 10–24 percent para-xylene, 40–60 percent meta-xylene and 5–20 percent ortho-xylene with 1–2 percent toluene and/or benzene often being present.

In the process of the present invention, no novelty is asserted as to any of the individual steps employed therein with the novel invention residing in the unique manner in which these steps are combined. Therefore, according to the process of the present invention, meta-xylene may be extracted from a $C_8$ aromatic mixture by any means well known to the art such as selective sulfonation, molecular sieve sorption or HF—$BF_3$ extraction.

In the separation of meta-xylene by selective sulfonation, sulfuric acid and meta-xylene are contacted, preferably at a 2:1 acid to meta-xylene mole ratio, thereby forming a heavy, meta-xylene sulfonic acid phase and a lighter, predominantly ortho-xylene, para-xylene and ethylbenzene phase. These phases are then separated and the meta-xylene sulfonic acid phase is subjected to hydrolysis, thereby reversing the sulfonation reaction and freeing the meta-xylene for recovery, typically by fractionation.

More specifically, it is preferred to utilize about 96–98 percent sulfuric acid but acid strengths as low as 75 percent may be utilized. Temperatures may vary from about 25° C. to about 100° C. The selective hydrolysis may be performed by first heating the sulfonic acid mixture to a temperature such that a para-xylene rich fraction distills off and until the temperature reaches about 120° C. The actual hydrolysis is then effected by heating the resultant sulfonic acid solution in the presence of water (or steam) at a temperature of about 110° C. −150° C. thereby selectively distilling off substantially pure meta-xylene vapors. The residual sulfonic acids are further hydrolyzed by heating the mixture to 150°-250° C. to effect the recovery of the remaining xylenes. To avoid dilution of the sulfuric acid, the hydrolysis may be effected with a paraffinic solvent such as hexadecane.

A preferred mode for extracting meta-xylene from a $C_8$ aromatic feed stock is the utilization of an HF—$BF_3$ extraction technique. A particularly preferred HF—$BF_3$ extraction technique is that taught in British Pat. Specification No. 1,144,067, the teachings of which are specifically incorporated by reference herein. Briefly, this mode of meta-xylene extraction comprises contacting a mixed xylene-ethylbenzene mixture, an inert diluent, hydrogen fluoride and boron trifluoride in certain, correlated proportions in an extraction zone. Removed, as a result, is a separate HF phase containing predominantly boron trifluoride, meta-xylene, and hydrogen fluoride and a separate xylene-ethylbenzene diluent phase. The exact amounts of HF, $BF_3$, $C_8$ aromatics and diluent as well as the intricacies associated with effecting the separation may be found from the description and equilibrium diagrams in the foregoing British Specification.

Temperatures preferably utilized in the HF—$BF_3$ extraction are about −20° C. to about 30° C. with an imposed pressure sufficient to maintain the extraction components in the liquid phase—i.e. 15-300 p.s.i.g. The diluent for the extraction mixture increases the selectivity for the HF and $BF_3$ extractant while simultaneously depressing any undesirable side reactions of ethylbenzene. Suitable diluents include $CCl_4$ and the $C_4$—$C_6$ aliphatic hydrocarbons. The exact extraction may be effectively performed in a packed tower, perforated plate tower, pulsed tower, or a combination of a stirred vessel and a mixer-settler.

Whatever mode is utilized to effect the contacting of the HF, $BF_3$, diluent and $C_8$ aromatics, the resultant immiscible extraction mixture is separated into a xylene phase containing para-xylene, ortho-xylene, diluent, toluene, benzene and entrained amounts of HF and $BF_3$ and a meta-xylene HF—$BF_3$ complex phase substantially free of other $C_8$ aromatics—i.e. less than about 5 percent other xylenes and less than about 1 percent ethylbenzene. The xylene phase, so recovered, is then stripped, or fractionated, to remove overhead the HF, $BF_3$, diluent, benzene and toluene to produce an ethylbenzene, para-xylene and ortho-xylene mixture.

This ethylbenzene containing mixture is then subjected to a super fractionation technique of a type well known to those trained in the art to recover overhead an ethylbenzene stream and a relatively ethylbenzene free—i.e. less than about 2 percent, ortho-xylene and para-xylene containing stream. This ortho-xylene and para-xylene stream is then separated, preferably in conjunction with the ortho-xylene para-xylene stream recovered from the hereinafter described isomerization zone, to produce a para-xylene stream and an ortho-xylene stream. While this ortho-xylene-para-xylene separation may be performed by any manner known to the art such as fractional crystallization, a preferred mode of operation is to first separate these two isomers by fractional distillation to produce a para-xylene concentrate stream—i.e. containing at least about 80 percent para-xylene, and an ortho-xylene stream—i.e. containing at least about 95 percent ortho-xylene. This para-xylene concentrate is then purified by conventional fractional crystallization techniques well known to those trained in the art. Produced as a result is a para-xylene product of at least about 98 percent purity. This preferred mode of operation, utilizing a prefractionation of the ortho-xylene para-xylene mixture to concentrate the para-xylene prior to crystallization instead of a single crystallization step, takes advantage of the boiling point difference between the isomers to effect a relatively simple fractionation split, and greatly lower the amount of xylenes which need processing in the more expensive crystallization step. Further, in addition to the decreased throughput imposed on the crystallizer, the crystallizer is able to operate at a higher, less expensive temperature level (i.e. 0°-10° C.) than that presently utilized by the art (i.e. about −70° C.) to separate para-xylene from a xylene-ethylbenzene mixture.

The meta-xylene-HF-$BF_3$ complex phase, or a portion thereof, may be stripped of HF and $BF_3$ to yield a crude meta-xylene residue suitable for isomerization according to the process of the present invention or, which upon further fractionation, yields pure meta-xylene. When stripping the HF and $BF_3$ from the complex to produce a pure meta-xylene product, it is preferred to cycle hot inert hydrocarbon vapors to provide rapid heat transfer to the complex thereby avoiding side reactions to a substantial extent.

Since an object of the present invention is to maximize para-xylene production by the isomerization of at least a portion of the more readily available, in terms of quantity, meta-xylene by isomerizing the meta-xylene, no matter how recovered, in a xylene isomerization zone, a preferred mode of isomerization when first utilizing an HF—$BF_3$ extraction technique for the recovery of the meta-xylene is to utilize HF—$BF_3$ as an isomerization catalyst. This isomerization reaction is effected by utilizing between 0.3 and 5.0 moles of HF and between 0.03 and 0.5 moles of $BF_3$ per mole of xylene to be isomerized. Preferably, an isomerization diluent such as a $C_5$—$C_7$ paraffin or a trimethylbenzene in an amount between 0.3 and 3 moles per mole of xylene is utilized to help prevent any side reactions from occurring. Suitable isomerization conditions include temperatures between 50° and 110° C., pressures of about 50 p.s.i.g. to about 500 p.s.i.g. and residence times of about 0.1 to about 10 hours. A preferred mode of operation is to simply pass the meta-xylene-HF—$BF_3$ complex, as recovered from the initial complex formation to an isomerization reactor maintained at the foregoing isomerization conditions. This reactor may be any reactor suitable for effecting a liquid phase reaction such as a perforated plate tower, a pulsed tower, a packed tower or a stirred vessel. The flow through such a reactor may be upflow, downflow, cocurrent flow or concurrent flow.

When utilizing, as an isomerization catalyst, the HF and $BF_3$ as contained in the meta-xylene complex withdrawn from the extraction zone, the resultant isomerization reaction effluent will comprise a system analogous to that obtained in the first HF—$BF_3$ extraction, namely a meta-xylene-HF—$BF_3$ complex phase and an ortho-xylene-para-xylene-diluent phase. For complete conversion of the meta-xylene, the HF—$BF_3$ complex phase is recycled back to either the first HF—$BF_3$ extraction or more preferably, simply back to the isomerization reactor. In any event, the ortho-xylene-para-xylene diluent phase is separately processed, removing therefrom, if present, entrained HF and $BF_3$, diluent, benzene and toluene to produce a para-xylene-ortho-xylene mixture which is then processed, as hereinbefore described for the ethyl-benzene fractionation bottoms, to produce a pure para-xylene product.

Another mode of isomerizing meta-xylene recovered from a $C_8$ aromatic feed stock, in addition to the hereinbefore described technique for isomerizing the meta-xylene contained in an HF—$BF_3$ meta-xylene complex, comprises contacting relatively pure meta-xylene as recovered from any meta-xylene separation scheme such as a selective sulfonation, molecular sieve sorption or even as ultimately recovered from an HF—$BF_3$ extraction with an isomerization catalyst contained in an isomerization zone and maintained at isomerization conditions. These isomerization conditions and catalyst are selected to produce an isomerization zone product relatively free of ethylbenzene, i.e. less than 2 percent, and containing meta-xylene, para-xylene and ortho-xylene. This result is readily obtained by utilizing conventional $C_8$ aromatic isomerization catalysts of an acid acting type which are well known to those trained in the art. These catalysts include, in addition to the described HF catalytic system, the highly acidic refractory inorganic oxides, either utilized as is, or in combination with a hydrogenation-dehydrogenation component. Such refractory inorganic oxides include halogenated alumina, particularly those containing 0.1–10 weight percent fluorine or chlorine, silica-alumina, either as is or halogenated, the hydrogen form of the zeolitic crystalline aluminosilicates such as faujasite or mordenite, or combinations of faujasite or mordenite and alumina. Suitable hydrogenation-dehydrogenation components include metals of groups IB, VIB and VIII of the Periodic Table of Elements, namely copper, gold, silver, chromium, molybdenum, tungsten, iron, cobalt, nickel, ruthenium, rhodium, palladium, osmium, iridium and platinum. Preferred metals are platinum or palladium. A particularly preferred catalytic composite comprises 0.1 to about 2 weight percent platinum, and 0.1 to about 5 weight percent fluorine and/or chlorine combined with a gamma-alumina carrier material.

Suitable isomerization conditions when utilizing the foregoing refractory inorganic oxide catalysts include a temperature of about 200° C. to about 650° C., preferably about 350° C. to about 550° C., pressures of about atmospheric to about 100 atmospheres and liquid hourly space velocities of about 0.1 hr.$^{-1}$ to about 10 hr. $^{-1}$. Further, particularly when utilizing an isomerization catalyst containing a hydrogenation-dehydrogenation component such as platinum, the meta-xylene may be commingled with hydrogen at a hydrogen to hydrocarbon mole ratio of about 0.5:1 to about 20:1. In addition, when utilizing a catalyst containing a hydrogenation-dehydrogenation component in the presence of hydrogen, the temperature, pressure and space velocities are correlated to minimize the formation of naphthenic hydrocarbons by the hydrogenation of the $C_8$ aromatics and the possible attendant formation of small amounts of ethylbenzene. In other words, by correlating high temperatures with low pressures, excessive hydrogenating conditions are avoided.

The isomerization reaction utilizing the foregoing refractory inorganic oxide catalysts is effected in an isomerization zone wherein the solid catalyst may be used as a fixed bed or moving bed with the xylenes being contacted with the catalyst in an upflow, downflow or radial flow fashion. Preferred is a fixed-bed, vapor-phase, downflow system.

The resultant product from the isomerization zone contains a xylene mixture of an approximate thermodynamic equilibrium. In addition small amounts of benzene, toluene and $C_9$ aromatics may be formed. From this product, meta-xylene is separated and recycled utilizing any of the foregoing described selective meta-xylene separation techniques in a separation zone apart from the initial meta-xylene separation. The resultant para-xylene and ortho-xylene mixture is then separated, as hereinbefore described, in a para-xylene ortho-xylene separation zone which is preferably a combination fractionation-crystallization technique. Thus, the xylenes so produced need not be processed in the ethylbenzene fractionation column.

DESCRIPTION OF THE DRAWING

The process of the present invention can be most clearly described by reference to the attached drawing, schematically illustrating the production of para-xylene from a mixed $C_8$ aromatic feed stock. Of necessity, certain limitations must be present in a schematic diagram of the type presented and no intention is made thereby to limit the scope of this invention to reactants, rates, operating conditions, catalysts, etc. Miscellaneous appurtenances including valves, pumps, compressors, separators, reboilers, etc. have been eliminated. Only those vessels and lines necessary for a complete and clear understanding of the invention are presented, with any obvious modifications made by those possessing expertise in the art of alkylaromatic isomerization being included within the broad scope of the present invention.

Referring to the schematic diagram, a $C_8$ aromatic feed stock containing meta-xylene, para-xylene, ortho-xylene and ethylbenzene is passed via line 1 to HF—$BF_3$ separation zone 2 of the type shown in British Pat. Specification No. 1,144,067. This zone 2 is maintained at a temperature of about −20° to about +30° C. and under a pressure sufficient to maintain the HF and $BF_3$ in the liquid phase. Within this zone a meta-xylene-HF-$BF_3$ phase, relatively free of the other $C_8$ aromatic isomers is formed and removed via line 13. The remaining $C_8$ aromatics (para-xylene, ortho-xylene and ethylbenzene), relatively free of meta-xylene are removed via line 3 and passed to fractionator 4 wherein any entrained HF and $BF_3$, diluent, benzene and toluene contained therein are removed overhead via line 5. The resultant xylene-ethylbenzene mixture is withdrawn as bottoms via line 6 and passed to fractionator 7.

Fractionator 7 is a typical ethylbenzene superfractionator wherein ethylbenzene is removed overhead via line 8. For sake of simplicity this fractionator is represented as a single column, whereas in actual practice it may be a series of two or three columns. Removed as bottoms from fractionator 7 via line 9 is an ortho-xylene-para-xylene stream which is passed to fractionator 10.

In fractionator 10, para-xylene stream 9 from fractionator 7 and para-xylene-ortho-xylene stream 25 recovered from the hereinafter described isomerization zone 14 are fractionated to recover a relatively rich para-xylene stream as overhead via line 11 and a relatively rich ortho-xylene stream via line 12. If desired, ortho-xylene stream 12, by means not shown, may be recycled to the hereinafter described isomerization zone 14 and/or this stream may be further fractionated to remove therefrom any $C_9$+ aromatics and produce an ortho-xylene stream as product and/or for recycle as described.

Para-xylene stream 11 removed as overhead from fractionator 10, is then passed to para-xylene crystallizer 19 wherein a relatively pure para-xylene product is removed via line 20 and a residual mother liquor $C_8$ aromatic stream is removed via line 21. This residual stream contains in addition to para-xylene, small amounts of the meta-xylene not removed in separation zones 2 and/or 16, ethylbenzene not removed in fractionator 7 and/or produced in isomerization zone 14 and ortho-xylene not recovered as bottoms in fractionator 10. Preferably this stream is then recycled to isomerization zone 14 by means not shown.

Meta-xylene-HF—$BF_3$ complex stream 13 removed from separation zone 2 is passed to isomerization zone 14 wherein the complex and any recycle meta-xylene entering via line 18 (or ortho-xylene from fractionator 10) is brought to a reaction temperature of about 50° C. to about 110° C. and a pressure of about 5 atmospheres to about 30 atmospheres. The resultant product is a xylene mixture in approximately thermodynamic equilibrium, which is removed via line 15 and passed to separation zone 16. In separation zone 16, an HF—$BF_3$-meta-xylene complex containing stream is separated and removed via line 18 and recycled to isomerization zone 14 with a portion thereof passed to separation zone 2 via line 22 to prevent accumulation of HF and $BF_3$ in the isomerization loop of the process. The remaining para-xylene and ortho-xylene are removed via line 17 and passed to fractionator 23. In a manner similar to that employed in fractionator 4, entrained $BF_3$—HF, diluent, benzene and toluene are removed via line 24 from the residual xylene phase and produce para-xylene-ortho-xylene stream 25. Para-xylene-ortho-xylene stream 25 is then passed to fractionator 10 wherein para-xylene and ortho-xylene are recovered in a manner hereinbefore described. Further, any ethylbenzene which has accumulated in the isomerization zone loop may be removed by removing, as a purge, a small stream from line 25, by means not shown, and passing this stream to fractionator 7 to move the ethylbenzene.

I claim as my invention:

1. A process for the production of para-xylene from an ortho-xylene, para-xylene, meta-xylene and ethylbenzene containing $C_8$ aromatic feedstock which comprises the steps of:

a. separating meta-xylene from said feedstock in a first separation zone to produce a first, relatively ethylbenzene free, meta-xylene containing stream and a para-xylene, ortho-xylene and ethylbenzene containing stream;

b. contacting, in an isomerization zone, at least a portion of said first meta-xylene stream with an isomerization catalyst at isomerization conditions selected to produce an isomerization zone product relatively free of ethylbenzene and containing meta-xylene, para-xylene and ortho-xylene;

c. separating meta-xylene from said isomerization zone product in a second separation zone to produce a second meta-xylene containing stream and a first ortho-xylene and para-xylene containing stream;

d. separating, in a first fractionation zone, said para-xylene, ortho-xylene and ethylbenzene stream produced in step (a) into an ethylbenzene stream and a relatively ethylbenzene free, second ortho-xylene and para-xylene containing stream; and e. separating said second ortho-xylene and para-xylene stream produced in step (d) and said first ortho-xylene and para-xylene containing stream produced in step (c) to produce a para-xylene stream and an ortho-xylene stream.

2. The process of claim 1 wherein at least a portion of said second meta-xylene stream produced in step (c) is recycled to said isomerization zone of step (b).

3. The process of claim 1 wherein at least a portion of said ortho-xylene stream produced in step (e) is recycled to said isomerization zone of step (b).

4. The process of claim 1 wherein said first separation zone comprises an HF—BF$_3$ meta-xylene extraction zone.

* * * * *